(12) United States Patent
Weiss et al.

(10) Patent No.: US 10,336,227 B1
(45) Date of Patent: Jul. 2, 2019

(54) VEHICLE SEAT PROTECTOR

(71) Applicants: Ori Weiss, Givatayim (IL); Einat Weiss, Givatayim (IL)

(72) Inventors: Ori Weiss, Givatayim (IL); Einat Weiss, Givatayim (IL)

( * ) Notice: Subject to any disclaimer, the term of this patent is extended or adjusted under 35 U.S.C. 154(b) by 0 days.

(21) Appl. No.: 15/974,724

(22) Filed: May 9, 2018

(51) Int. Cl.
  *B60N 2/60* (2006.01)
  *A47C 31/11* (2006.01)

(52) U.S. Cl.
  CPC .......... *B60N 2/6036* (2013.01); *A47C 31/113* (2013.01)

(58) Field of Classification Search
  CPC .............................. B60N 2/6036; A47C 31/113
  USPC ............................................. 297/182, 228.11
  See application file for complete search history.

(56) References Cited

U.S. PATENT DOCUMENTS

| | | | |
|---|---|---|---|
| 5,161,854 A * | 11/1992 | Yokoto | A47C 7/40 297/182 |
| 5,549,353 A * | 8/1996 | Gaudet | B60N 2/2824 297/182 X |
| 6,428,098 B1 | 8/2002 | Allbaugh | |
| 6,948,771 B1 * | 9/2005 | Salandy | A47C 31/11 297/228.11 X |
| 7,000,984 B1 | 2/2006 | Ward | |
| 7,275,786 B2 * | 10/2007 | Kobayashi | B60N 2/58 297/182 |
| 9,045,067 B2 | 6/2015 | Long et al. | |
| 2003/0085598 A1 | 5/2003 | Monday | |
| 2005/0264056 A1 | 12/2005 | Hanberg | |
| 2011/0272982 A1 | 11/2011 | McDonald | |
| 2015/0069804 A1 * | 3/2015 | Long | B60N 2/6036 297/219.1 |

FOREIGN PATENT DOCUMENTS

| | | |
|---|---|---|
| DE | 102006057257 | 5/2008 |
| JP | 3179049 | 9/2012 |
| WO | WO 03/007760 | 1/2003 |
| WO | WO 2008/002684 | 1/2008 |
| WO | WO 2010/057258 | 5/2010 |

* cited by examiner

*Primary Examiner* — Anthony D Barfield

(57) ABSTRACT

A seat protector for a typical vehicle seat that has a base and a back and the shape of a trough where the seat base meets the seat back, any liquid on the seat therefore tending to pool in the trough. The seat protector has a fixing attachment for fixing the seat protector in a predetermined orientation with respect to the seat; and a liquid absorption insert aligned across the seat protector to extend at least partly along the trough when the seat protector is correctly orientated on the seat, to absorb the liquid as it pools.

15 Claims, 6 Drawing Sheets

VEHICLE SEAT PROTECTOR

FIELD AND BACKGROUND OF THE INVENTION

The present invention, in some embodiments thereof, relates to a vehicle seat protector and, more particularly, but not exclusively, to a protector that protects the seat from liquid, especially water.

It is not uncommon for people who are soaking wet to enter a vehicle and sit down. There may be heavy rain, or people may have been swimming or surfing and may not have had time or the opportunity to dry before entering the vehicle.

In other cases, small children or the elderly and incontinent or drunk people may soil the seating in the vehicle. The latter is particularly a concern with police vehicles and taxis.

Vehicle seats may be made from a range of materials, including leather, plastics and textiles. Textile seats in particular can be affected by water and are hard to clean from soiling.

One common solution, widely used by garages when servicing and repairing cars, is simply to place a thin plastic sheet over the seats. This protects the seats from dust and dirt, but is not really intended for wet.

An alternative solution is disclosed in US Patent Application No. 2003/0085598A1 to Wesley Monday, filed Nov. 6, 2001, which discloses a disposable highly absorbent seat cover. The cover is intended for police officers to protect their police car seats from stains and odors caused by apprehended suspects riding in the police cars. The cover includes a highly absorbent material, such as a super absorbent polymer, so that urine and other substances are quickly absorbed into the cover instead of staining the vehicle seat and defiling the vehicle. The cover can also be conveniently attached and removed from the vehicle seat by means of hook and loop or other fasteners.

A problem with this approach is that the amount of absorbent material used, sufficient to cover the entire seat surface, makes the solution expensive.

DE102006057257A1 to Frank Renz and Wolfgang Schnirring, filed 22 Nov. 2006, discloses an incontinence cover for seats, e.g. for wheelchairs, furniture, child seats and for seats in vehicles, which has a moisture absorbing layer and is fitted via removable fastenings to enable soiled covers to be cleaned in a washing machine at temperatures of at least 30 deg. C. The cover is secured by stitches, adhesive, press tapes, sliding clasp fasteners, press studs, welding or by any suitable means.

U.S. Pat. No. 9,045,067 to Nancy E Long et al., filed 9 Sep. 2013 discloses a generic, easy-to-use, temporary, reusable, absorbent, moisture impermeable, home launderable, protective vehicle seat cover designed for any seat with a headrest. The cover is designed to work with any type of seat (bucket or bench seat), or location of seat (front or back seat), or type of vehicle (sedan, van, truck, bus, train). The seat cover is able to be used individually or can be linked together to cover contiguous seats. The cover installs and removes quickly over a headrest being secured by Velcro™. The construction uses multi-layer, elongated, rectangular materials, which loosely covers the front surfaces of the seat. The seat cover consists of two layers: an upper layer that absorbs wetness, dirt, odor, and other contaminants and wicks moisture away from the user; and a lower layer that blocks any liquids or other contaminants from reaching the vehicle's upholstery. The design easily enables repeated installation-removal-laundering cycles. The seat cover is economically designed for home laundering and environmentally designed for efficient washing and drying.

Additional background art includes WO201057258A1 and U.S. Pat. No. 7,000,984.

SUMMARY OF THE INVENTION

The present invention takes advantage of the fact that a typical car seat dips backwards to a trough where the base of the seat meets the upright back portion. Water, finding its level, flows towards the trough and thus water absorbent material is needed only in the trough area. A seat cover may thus be provided with a water impermeable or water resistant portion that extends over the seat but which has a water absorbent portion limited to the trough area as defined by the contouring of the seat.

According to an aspect of some embodiments of the present invention there is provided a seat protector for a seat in a vehicle, the seat having a base and a back, and contouring on the base defining a trough where the seat base approaches the seat back, liquid on the seat tending to pool in the trough, the seat protector having:

at least one fixing attachment for fixing the seat protector in a predetermined orientation with respect to the seat; and a liquid absorption insert aligned across the seat protector to extend at least partly along the trough when the seat protector is in the predetermined orientation, to absorb the liquid tending to pool.

In embodiments, the liquid absorption insert has a length and a width, wherein the length is oriented along the trough and the width is smaller than the length.

The protector may have an upper side for sitting on, a lower side for facing the seat and a slit aligned along the trough when the protector is in the predetermined orientation, wherein the liquid absorption insert is attached to the lower side under the slit.

The protector may be made of a water-resistant material.

In an embodiment, the fixing attachment comprises a hood for fitting over a head rest. Alternatively or additionally, the fixing attachment comprises shoulders for extending along respective sides of the seat, and a cord for joining the shoulders across a back of the seat.

The seat protector may be made for fitting over a driving seat or a front passenger seat of a car or taxi or like vehicle. The seat protector may be made for fitting over a multiple person vehicle seat such as the back passenger seat of a car or two or three person passenger seats of a minibus.

The seat protector may have holes sized and positioned for allowing access to seat belt buckles.

The seat protector may have a plurality of hoods for attaching over a plurality of headrests of the multiple person vehicle seat.

According to a second aspect of the present invention there is provided a method of protecting vehicle seats from pooling of liquid, the seats having troughs towards the seat backs, each trough having a trough axis, the method comprising:

providing a water absorbent material;

placing the water absorbent material in the trough; and aligning the water absorbent material along the trough axis.

The method may comprise attaching the water absorbent material to a seat protector, the seat protector being sized and shaped to be fitted over the seat thereby to carry out the placing and the aligning.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to a seat cover and protector and, more particularly, but not exclusively, to such a seat cover and protector that protects the seat and the vehicle from water and from soiling.

The seat protector is for a seat in a vehicle. The seat is a typical vehicle seat that has a base and a back, the base having a front height that dips to a back height lower than the front height where the base meets the seat back, forming a trough across the back part of the seat, and any liquid on the seat therefore tends to pool in the trough.

The seat protector is designed to be water resistant and to follow the contour of the seat. Liquid may thus flow over it rather than through it, and thus pool in the trough.

The seat protector may have one or more fixing attachments such as hoods that fit over headrests, or shoulders that are joined across the backs of the seats or skirts that spread over the base of the seat and these serve to fix the seat protector in a specific orientation with respect to the seat. A liquid absorption insert is aligned across the seat protector so as to extend at least partly along the trough when the seat protector is in its preferred orientation, and the insert thus absorbs the liquid tending to pool.

The present embodiments may thus provide a water absorbent material, typically as an insert to the protector, place the water absorbent material in the trough; and align the water absorbent material along the trough axis.

It is to be understood that seats may vary in their contouring, so that some seats may have a trough further forward of the point at which the base meets the back of the seat, or the trough may be limited to the central part of the seat. In such cases the position of the liquid absorbent insert may be adjusted accordingly.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
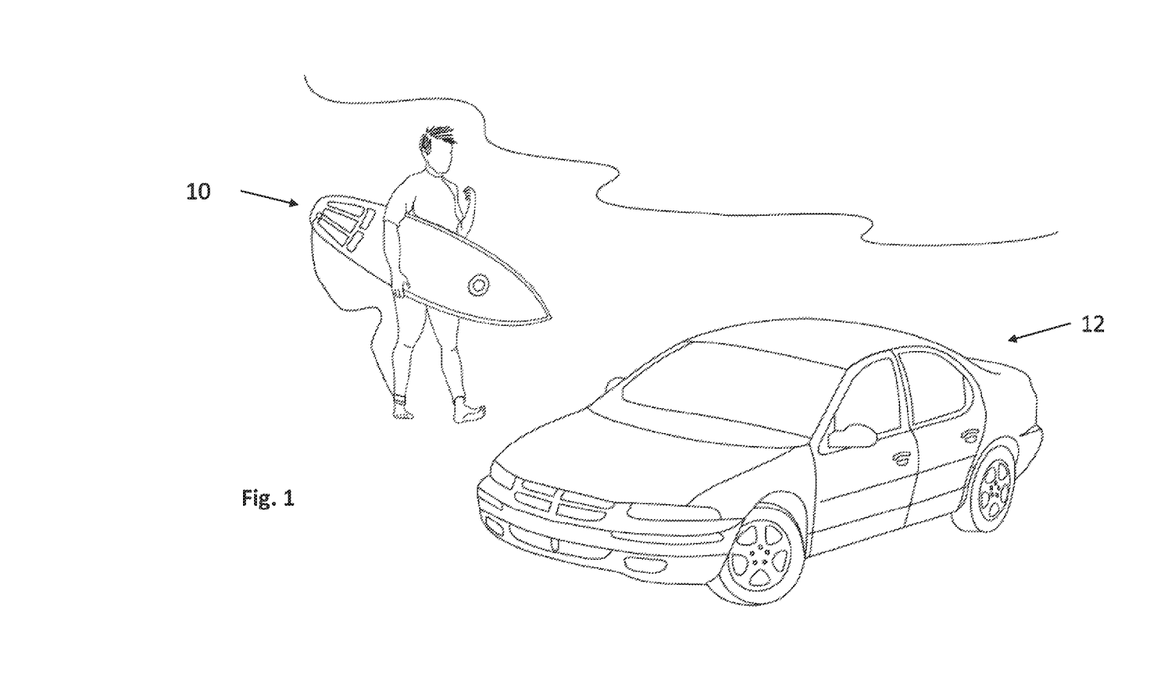
FIG. 1 is a drawing of a wet surfer or swimmer returning to his/her car.

Referring now to the drawings, FIG. 1 illustrates one of many situations that the present embodiments address. Surfer 10 returns directly to vehicle 12 after surfing without wishing to or possibly without having the opportunity to dry following their encounter with the ocean waves.

Figure 2A:
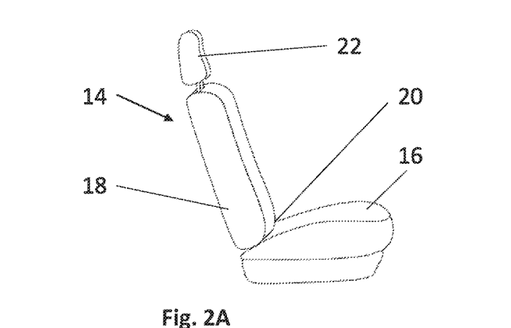
FIGS. 2A and 2B are side and perspective views respectively of a car seat showing the downward dip towards the back of the seat which is used in embodiments of the present invention.
Figure 2B:
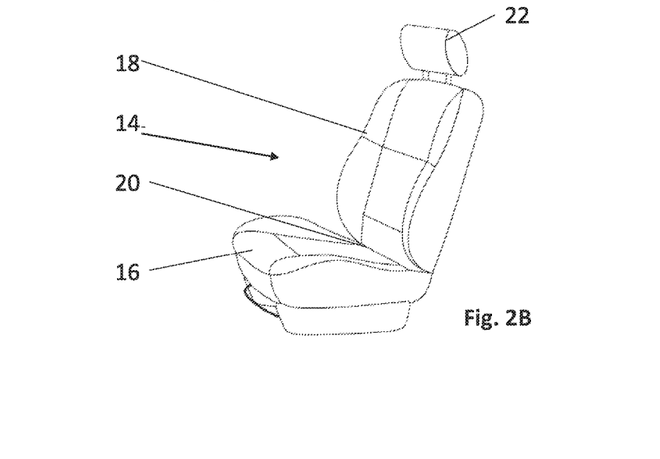

FIGS. 2A and 2B show car front seats 14 in side and perspective views respectively. The base 16 of the seat recedes downwards towards the back 18 of the seat and a trough 20 is formed by the outline of the seat at the line where the base 16 joins the back 18. Typically the seat has headrest 22.

Figure 3A:
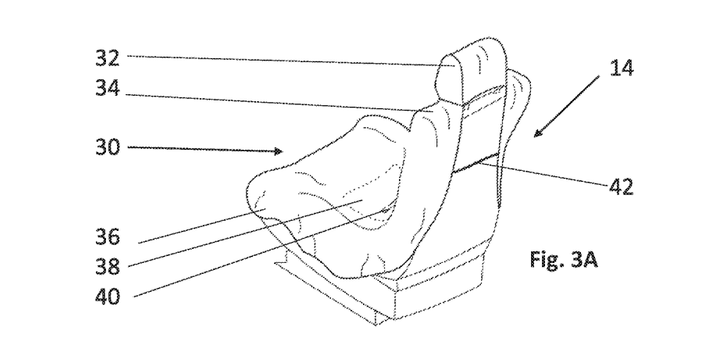
FIGS. 3A and 3B are two simplified perspective views of a seat protector over the seat of FIGS. 2A and 2B according to embodiments of the present invention.
Figure 3B:
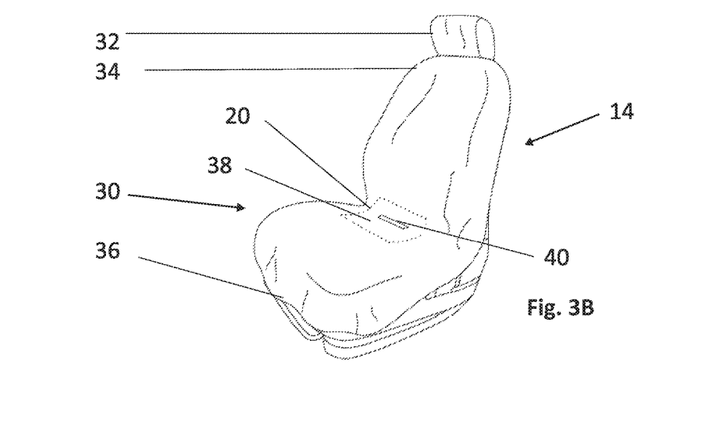

Reference is now made to FIGS. 3A and 3B which show the front seat 14 of FIGS. 2A and 2B covered with a seat protector 30 according to the present embodiments. The seat protector fits over the seat and adopts the seat contouring, thus following trough 20. When water falls on the seat protector, say from a wet person such as surfer 10, then the water tends to pool in the area of trough 20. The seat protector has attachment parts for fixing the seat protector in a predetermined orientation with respect to the seat. In this case the seat protector has a hood 32 and shoulders 34 for fitting over the headrest 22 and back 18 of the seat. The hood may simply fit over the head rest or may have sides which may be attached by Velcro™ or the like or may have a cord. The cord may be tightened. Likewise, as will be discussed in greater detail below, the protector may have shoulders that extend over the sides of the seat back and may be joined by a cord across the seat back.

The protector may also have a skirt 36 for fitting around the base 16 of the seat. Again in embodiments the skirt may simply fit over the base and in other case may be tightened by a cord. The attachment parts define the orientation of the protector with respect to the chair so that a properly attached protector has a given part that will be aligned along the trough.

Along the part aligned with the trough, a liquid absorption insert 38 is attached, say with adhesive tabs, or by stitching, to the protector. In the embodiment illustrated, the insert is actually placed on the underside of the protector and a slit 40 is cut in the protector for water to drain into the absorption insert. The insert and the slit are aligned across the seat protector to extend along the trough when the seat protector is correctly fixed on the seat using the attachment parts. The absorption insert may be made of material similar to or the same as materials used in nappies or diapers. The seat protector protects the seat from water dripping through to the seat but water may pool in the trough, and the absorption insert may deal with the problem of pooling, to absorb the pooled liquid before the liquid can penetrate to the seat or cause discomfort.

Reference numeral 42 indicates an optional cord or drawstring which can be used to hold the shoulders together from behind the seat.

The liquid absorption insert 38 is generally rectangular to extend along the trough and may be made long and thin to extend along the trough, with the width being minimal. The liquid absorption insert may thus be long and narrow with the longer side being placed along the width of the seat.

The seat protector itself may be made of a water resistant material and may have distinct upper and lower sides, an upper side for sitting on, and a lower side for facing the seat. The liquid absorption insert may be attached to the lower side under the slit. In an alternative embodiment, the liquid absorption insert may be placed on the upper side, in which case no slit is required.

Figure 4A:
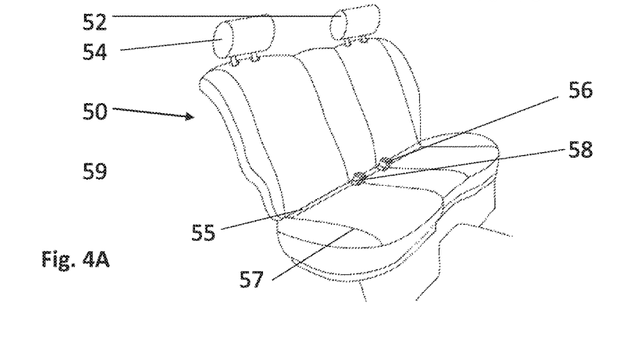
FIGS. 4A and 4B are simplified perspective views of the rear passenger seat of a vehicle with and without a protector according to embodiments of the present invention.
Figure 4B:
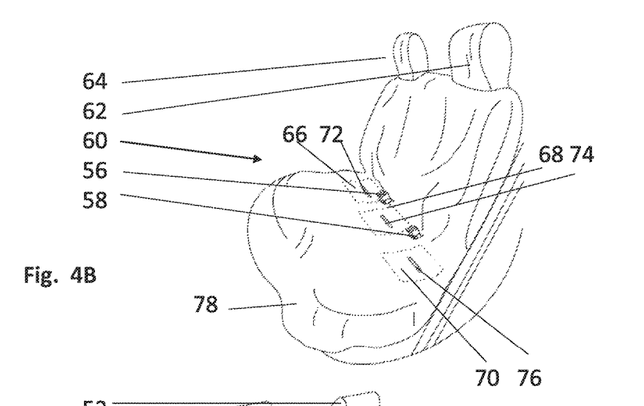

Reference is now made to FIGS. 4A and 4B which show the back passenger seat 50 of a typical car. FIG. 4A shows the seat 50 by itself with two headrests 52 and 54 and two seat belt buckles 56 and 58. Again, a trough 55 is formed by the base 57 of the seat falling towards the back of the seat.

FIG. 4B shows the seat covered by back passenger seat protector 60. The back passenger seat protector has first 62 and second 64 hoods that fit over the headrests. A variation with three hoods may be provided for back seats with three headrests. Holes are provided for the mid-seat buckles 52 and 54, and three separate inserts 66, 68 and 70 are provided together with separate slits 72, 74 and 76.

Skirt 78 allows the protector 60 to be fitted over the base of the back passenger seat.

Figure 5:
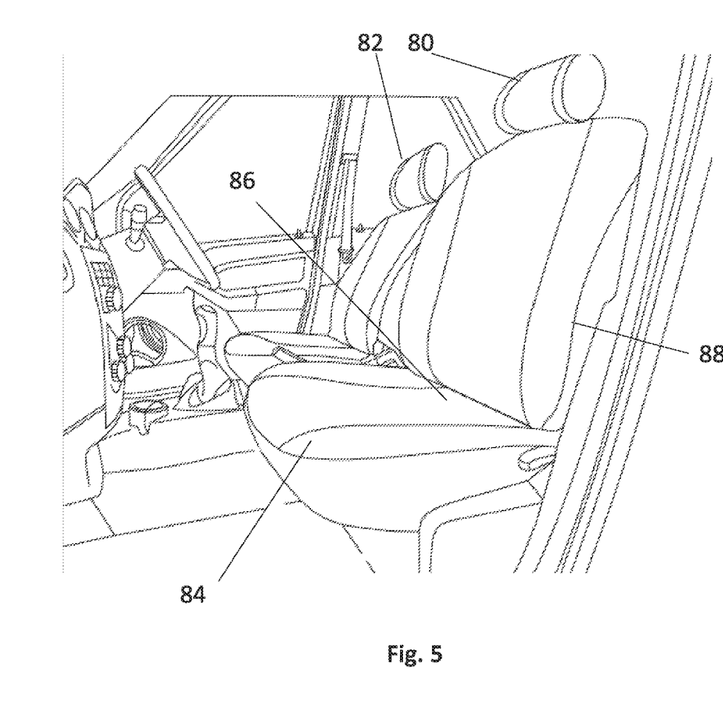
FIGS. 5, 6, 7 and 8 are four simplified perspective views of the front seats of a vehicle, with no protectors, one protector, two protectors and the two protectors viewed from behind, according to embodiments of the present invention.

Reference is now made to FIG. 5 which shows a schematic view of the front driver and passenger seats in a typical car. As discussed above, in both the driver seat 80 and passenger seat 82, the seat bases 84 fall away to form troughs 86 in front of the seat backs 88.

Figure 6:
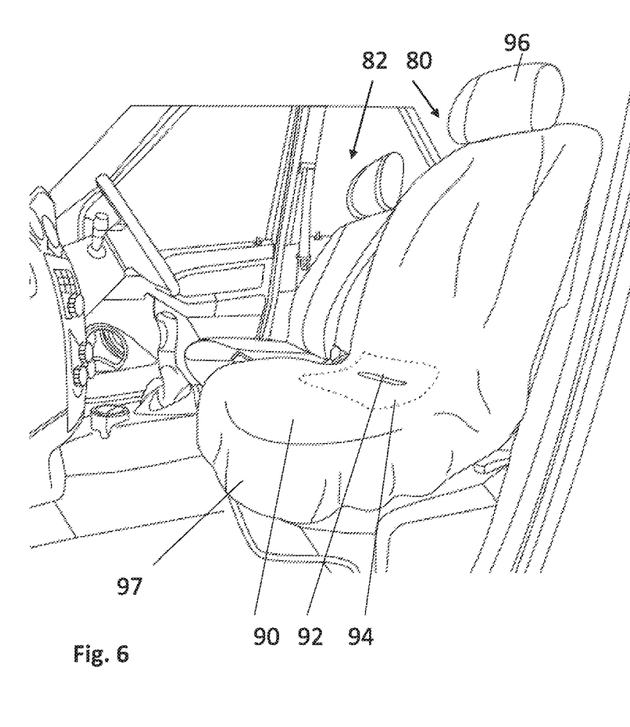

In FIG. 6, the driver seat 80 is covered with seat protector 90 according to an embodiment of the present invention. Protector 90 fits over the head rest and around the seat and slit 92 extends along the trough. Under the slit, liquid absorption insert 94 extends along the length of the slit and thus along some or all of the trough. Hoods 96 fit over the head rests of the seats and skirts 97 extend around the bases of the seats.

Figure 7:
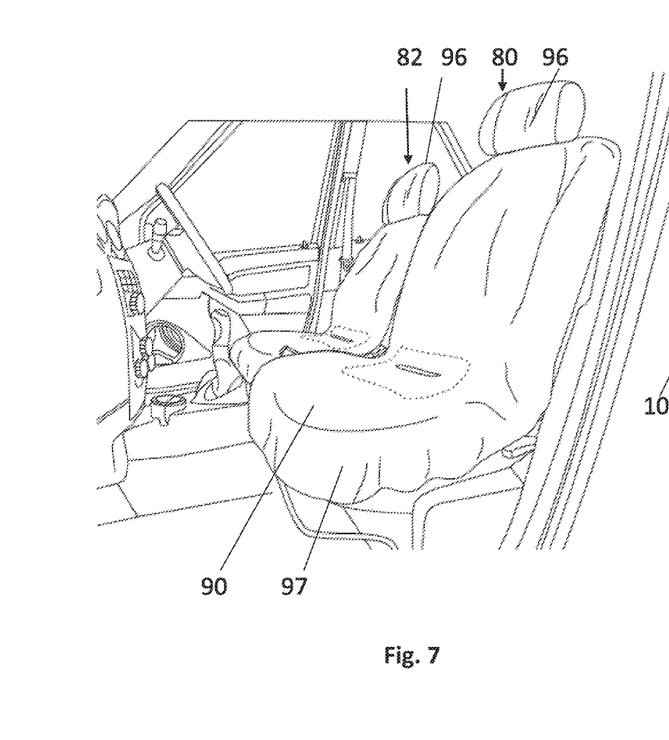

FIG. 7 is the same as FIG. 6, except that both the driver 80 and the front passenger seats 82 are covered with protectors 90. Hoods 96 fit over the head rests of the seats and skirts 97 extend around the bases of the seats.

Figure 8:
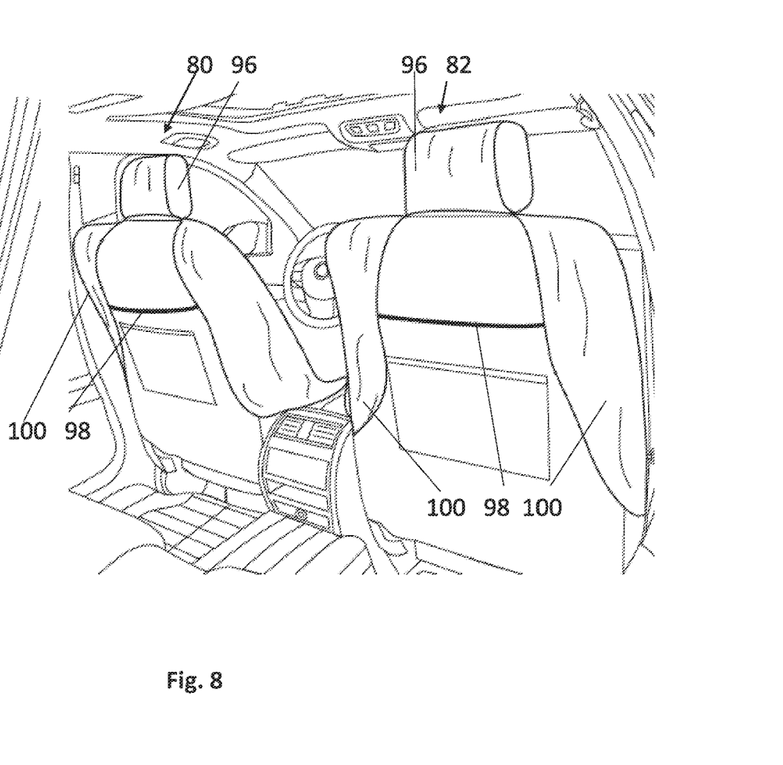

FIG. 8 is a view from the rear of driver 80 and front passenger seats 82 covered with protectors 90. Hoods 96 fit over the head rests and ties 98 hold the shoulders 100 across the seat backs.

Figure 9:
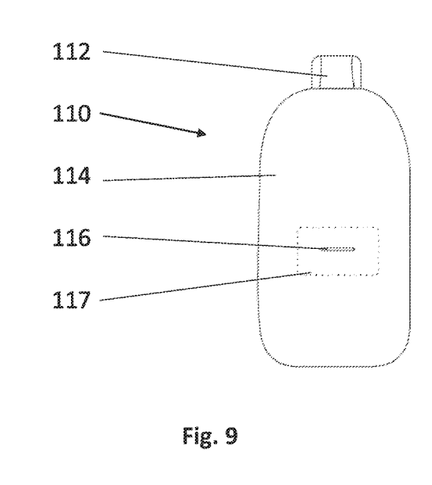
FIGS. 9 and 10 are simplified views from above and below of a seat protector according to an embodiment of the present invention showing the slit and the absorbent layer.

FIG. 9 is a schematic view of a seat protector 110 from above. A fixing attachment includes hood 112 which fits over a headrest. Body 114 is made of water resistant material. Slit 116 is located to fall in the trough at the back of the seat when the protector is correctly positioned on the seat using the fixing attachment. Under the slit—and thus shown in hashed lines, is the liquid absorption insert 117.

Figure 10:
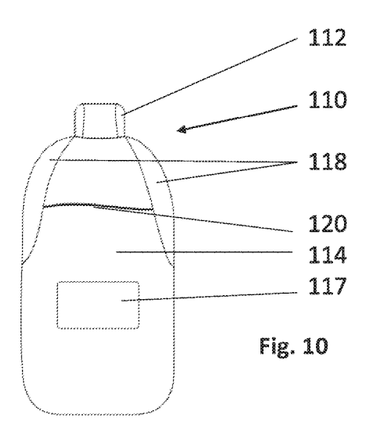

FIG. 10 is a view from below of the seat protector 110 of FIG. 9. Hood 112 is for fitting over a headrest. Body 114 is made of water resistant material. Shoulders 118 on either side fit around the sides of the seat back and are held together by cord 120 across the seat backs. The liquid absorption insert 117 may be fitted or glued, including being attached using adhesive tapes, onto the body under slit 116. In an alternative, a pocket may be provided under the slit 116 so that the liquid absorption insert can easily be replaced. In embodiments one time sticky tapes or pads may be used to attach the insert, in the same way that disposable nappies/diapers are placed in position.

The seat protector may thus cover most or all of the seat, however the liquid absorbent material need only be provided within the area of the trough in the contouring of the seat. Thus pooling of liquid due to a wet vehicle occupant can be effectively reduced with a minimal amount of liquid absorbing material.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the text is to be construed as if such a single embodiment is explicitly written out in detail. Conversely, various features of the invention, which are, for brevity, described in the context of a single embodiment, may also be provided separately or in any suitable subcombination or as suitable in any other described embodiment of the invention, and the text is to be construed as if such separate embodiments or subcombinations are explicitly set forth herein in detail.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A seat protector for a seat in a vehicle, the seat having a seat base and a seat back, and contouring on said base defining a seat trough in said seat where said seat base approaches said seat back, said trough being parallel to said seat back, liquid on said seat tending to pool in said trough, the seat protector comprising:
a water-resistant material spreadable over said seat;
at least one fixing attachment for fixing the water-resistant material of the seat protector over said seat base and said back across said trough such that the seat protector is in a predetermined orientation with respect to said seat and said seat trough; and
a liquid absorption insert having a length and a breadth, said length being greater than said breadth, and said length being aligned across said seat protector such that said liquid absorption insert length extends at least partly along said trough when said seat protector is in said predetermined orientation, the liquid absorption insert thereby absorbing said liquid tending to pool.

2. The seat protector of claim 1, wherein the liquid absorption insert has a length and a width, wherein the length is oriented along said trough and said width is smaller than said length.

3. The seat protector of claim 1, having an upper side for sitting on, a lower side for facing said seat and a slit aligned along said trough when said protector is in said predetermined orientation, wherein the liquid absorption insert is attached to the lower side under said slit.

4. The seat protector of claim 1, wherein said fixing attachment comprises a hood for fitting over a head rest.

5. The seat protector of claim 1, wherein said fixing attachment comprises shoulders for extending along respective sides of said seat, and a cord for joining said shoulders across a back of said seat.

6. The seat protector of claim 1, configured for fitting over a driving seat or a front passenger seat.

7. The seat protector of claim 1, configured for fitting over a multiple person vehicle seat.

8. The seat protector of claim 7, further comprising holes sized and positioned for allowing access to seat belt buckles.

9. The seat protector of claim 7, comprising a plurality of hoods for attaching over a plurality of headrests of said multiple person vehicle seat.

10. A method of protecting vehicle seats from pooling of liquid, the seats having bases and backs and troughs at the backs of the bases towards the seat backs, each trough having a trough axis parallel to said seat back, the method comprising:
   providing a water resistant material having a length and a breadth, the water resistant material having water absorbent material aligned thereon, said water absorbent material having a length and a breadth, said water absorbent material length being greater than said water absorbent material breadth and said water absorbent material length being aligned perpendicularly to said water resistant material length; and
   covering a seat base and seat back with said water resistant material such that said water resistant material length extends down said seat back and along said seat base over said trough and said water absorbent material length is aligned over said trough and along said trough axis.

11. The method of claim 10, comprising forming the water resistant material into a seat protector, the seat protector being sized and shaped to be fitted over the seat thereby to carry out said covering and said aligning.

12. A seat protector for a seat in a vehicle, the seat having a base and a back, and contouring on said base defining a trough in said seat where said seat base approaches said seat back, said trough having a lengthwise direction being parallel with said seat back, liquid on said seat tending to pool in said trough, the seat protector having:
   at least one fixing attachment for fixing the seat protector in a predetermined orientation with respect to said seat and said trough, wherein said fixing attachment comprises shoulders for extending along respective sides of said seat, and a cord for joining said shoulders across a back of said seat; and
   a liquid absorption insert having a length and a breadth, said length being greater than said breadth, the liquid absorption insert being aligned such that said length extends across said seat protector and along said lengthwise direction of said trough when said seat protector is in said predetermined orientation, said liquid absorption insert thereby absorbing said liquid tending to pool.

13. The seat protector of claim 12, for fitting over a multi-person vehicle seat, the protector further comprising holes sized and positioned for allowing access to seat belt buckles.

14. A seat protector for a seat in a vehicle, the seat having a base and a back, and contouring on said base defining a trough in said seat where said seat base approaches said seat back, liquid on said seat tending to pool in said trough, said trough having a lengthwise direction being parallel to said seat back, the seat protector having:
   at least one fixing attachment for fixing the seat protector in a predetermined orientation with respect to said seat and said trough, said fixing attachment comprising a hood for fitting over a seat head rest; and
   a liquid absorption insert having a length and a breadth, said length being greater than said breadth, said liquid absorption insert being aligned across said seat protector such that said length extends at least partly along said trough when said seat protector is in said predetermined orientation, to absorb said liquid tending to pool.

15. The seat protector of claim 14, comprising a plurality of hoods for attaching over a plurality of headrests of a multiple person vehicle seat.

* * * * *